United States Patent [19]
Brown

[11] 3,912,651
[45] Oct. 14, 1975

[54] ANHYDROUS ORGANOSILICON FLUIDS

[75] Inventor: Paul L. Brown, Saginaw, Mich.

[73] Assignee: Dow Corning Corporation, Midland, Mich.

[22] Filed: July 9, 1973

[21] Appl. No.: 377,492

[52] U.S. Cl.................................. 252/78; 252/49.6
[51] Int. Cl.².......................................... C09K 5/00
[58] Field of Search........ 252/78, 49.6; 260/448.2 R

[56] References Cited
UNITED STATES PATENTS
2,866,800   12/1958   MacKenzie et al................ 252/49.6
3,019,191   1/1962   Furby et al. .......................... 252/78
3,110,669   11/1963   Borg ................................... 252/49.6

*Primary Examiner*—Benjamin R. Padgett
*Assistant Examiner*—Deborah L. Kyle
*Attorney, Agent, or Firm*—Robert F. Fleming, Jr.

[57] ABSTRACT

Polydimethylsiloxane functional fluids are mixed with acyloxy silanes of the formula $(CH_3)_2Si(OOCR)_2$ where R is an alkyl radical of from 5 to 8 carbon atoms. The silane reacts with water thereby preventing accumulation of liquid water in the fluid system. These compositions are useful in hydraulic and damping operations.

4 Claims, No Drawings

ANHYDROUS ORGANOSILICON FLUIDS

Trimethylsiloxy endblocked polydimethylsiloxane fluids are ideal for many hydraulic and damping applications because they operate at both high and low temperatures. The operative range for such fluids is from −50°F. or below to 300°F. or above. In addition, such fluids are inert and do not attack metal or plastic materials. In spite of these desirable properties, there are some applications in which a problem arises. This is caused by the fact that water is not soluble in such siloxane fluids in amounts greater than 0.26 percent by weight. When the amount of water in the system exceeds this amount, liquid water collects. When this happens and the temperature approaches the boiling point of water, voids form in the fluid which can cause malfunction of the hydraulic or damping device. When the temperature drops below freezing, ice forms and this, of course, can plug lines or orifices. It has been found that if the fluid can absorb up to one percent by weight water without having liquid water precipitate, the above problems do not generally arise. At least one military specification requires that a hydraulic fluid be able to absorb one percent by weight water.

It is the object of this invention to provide an organopolysiloxane fluid system which avoids the above difficulties.

This invention relates to a composition of matter consisting essentially of (1) a trimethylsiloxy endblocked polydimethylsiloxane fluid and (2) a silane of the formula $(CH_3)_2Si(OOCR)_2$ in which R is an alkyl radical of from 5 to 8 carbon atoms, (2) being present in amount sufficient to remove up to one percent by weight water based on the weight of (1) from the mixture.

The fluids (1) employed herein are well-known articles of commerce and for the purpose of this invention, can vary in viscosity from .65 cs. up to 1,000,000 cs. In most hydraulic and damping applications, the preferred viscosity is in the range of from 50 to 10,000 cs.

The silanes operative herein are those of the defined formula which are soluble in the siloxane fluid and which produce, upon hydrolysis, acids which are also soluble in the fluid. This solubility should extend down to at least −40°F. In addition, the by-produced acid should not boil below 150°C.

Specific examples of operative silanes are dimethyl-bis-(2-methylbutanoyl)silane, dimethyl-bis-(octanoyl)silane, dimethyl-bis-(hexanoyl)silane, dimethyl-bis-(heptanoyl)silane, dimethyl-bis-(2-ethylpentanoyl)silane, dimethyl-bis-(4-methylpentanoyl)silane, dimethyl-bis-(3-methylpentanoyl)silane, and dimethyl-bis-(2-ethyl,2-methylbutanoyl)silane.

The amount of silane required varies depending upon the amount of water one wishes to remove. Generally one mole of silane per mole of water is required. For example, if one wished to remove up to one percent by weight water per 100 parts by weight of fluid, one would need to use at least 0.055 moles of silane per 100 parts by weight fluid. More or less amounts of water would require more or less silane.

It is believed that the water is removed by reaction of the silane with water to form the corresponding alkanoic acid and a hydroxylated silane. The hydroxylated silane may, in turn, react with more silane to produce an acyloxy disiloxane. It should be understood that applicant is not restricted to this explanation as to the operativeness of his invention.

It has been found that silane works satisfactorily per se when employed with the fluids of this invention. However, it is often desirable to speed up the reaction of the silane with the water and this can be done by employing any convenient catalyst for the reaction of acyloxy silanes with water. The requirements are that the catalyst be soluble in (1) to −40°F. and that it boil above 150°C. at 760 mm of Hg. The amount of catalyst is not critical but usually from 0.5 to 2 percent by weight based on the weight of (1) and (2) is sufficient. Amines represent one type of catalyst useful herein.

Suitable amines can be aromatic, aliphatic, cycloaliphatic and they can be silicon-containing amines. The amines can also be primary, secondary or tertiary. Specific examples of operative amines are, benzyldiethylamine, dioctylamine, dicyclohexylamine, and

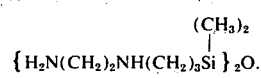

The term "consisting essentially of " as used herein means that the composition is composed of the defined fluid and the defined silanes and if desired a suitable catalyst, but can also contain other additives normally employed in hydraulic fluids or lubricants which do not interfere with the function of the silane. These materials include additives for swelling rubber in contact with the fluid such as organic esters or phosphate esters, lubrication additives and corrosion inhibitors.

The following examples are illustrative only and should not be construed as limiting the invention which is properly delineated in the appended claims.

EXAMPLE 1

The silane

was added to a mixture of 95 percent by weight of a 100 cs. trimethylsiloxy endblocked dimethylpolysiloxane fluid, 3 parts by weight of a diester of a dibasic acid sold under the name Plexol 201 and 2 parts by weight tributylphosphate. The ester and the phosphate are used to cause some swelling of rubber gaskets used in hydraulic systems. In some cases amines were added in the amount shown below. The ability of the silane to remove water from the system was checked at −40°F.

| Amount of Silane in % by Weight Based on the Weight of Fluid | Amine | Amount of Amine in % by Weight Based on the Weight of Fluid | Amount of Water Added in % by Weight Based on the Weight of the Fluid | Results at −40°F. |
|---|---|---|---|---|
| Blank | None | — | 1% | Cloudy |
| 20% | $\{NH_2CH_2CH_2NHCH_2\overset{CH_3}{\underset{|}{C}}H\overset{(CH_3)_2}{\underset{|}{C}}H_2Si\}_2O$ | 1 | 1% | Clear* |

Continued

| Amount of Silane in % by Weight Based on the Weight of Fluid | Amine | Amount of Amine in % by Weight Based on the Weight of Fluid | Amount of Water Added in % by Weight Based on the Weight of the Fluid | Results at −40°F. |
|---|---|---|---|---|
| 20% | {NH$_2$CH$_2$CH$_2$NH(CH$_2$)$_3$Si(CH$_3$)$_2$}$_2$O | 1 | 1% | Clear |
| 20% | di—2—ethylhexylamine | 1 | 1% | Clear |
| 20% | None | — | .1% | Clear |

*Indicates that no liquid water remained.

In each of the above cases, the fluid was agitated to disperse the water before subjecting to −40°F. Equivalent results are obtained when the diester and the phosphate are omitted from the above formulations.

EXAMPLE 2

The silane (CH$_3$)$_2$Si(OOCC$_7$H$_{15}$)$_2$ was mixed with a 50 cs. trimethylsiloxy endblocked dimethylpolysiloxane fluid in amount of 30% by weight silane and 70% by weight fluid. 2% by weight based on the combined weights of fluid and siloxane of benzyldimethylamine was added. 1% by weight water based on the combined weights of the fluid and silane was then added and the mixture was shaken. Cloudiness developed but it disappeared in a few minutes showing that the water had been consumed.

EXAMPLE 3

Example 2 was repeated with the same results. The sample of fluid after it had become clear was analyzed by the Karl Fischer method and shown to contain no water.

EXAMPLE 4

The silanes employed in this invention can be prepared by reacting dimethyldichlorosilane with the corresponding alkanoic acid in the presence of a hydrogen halide acceptor.

64 g. of dimethyldichlorosilane was added slowly with stirring to a mixture of 144 g. of 2-ethylhexanoic acid in 150 ml. of toluene and 100 ml. of dry pyridine. An exothermic reaction took place. The precipitated pyridine hydrochloride made stirring difficult. The container was saturated with ammonia to convert the pyridine hydrochloride to pyridine and ammonium chloride. The latter was easily removed by filtration. The solvent and pyridine were stripped off and the product was shown by GLC to be at least 95% pure dimethyl-bis-2-ethylhexanoylsilane.

EXAMPLE 5

Equivalent results are obtained when the following silanes are employed in the procedure of Example 2: dimethyl-bis-(2-methylbutanoyl)silane, dimethyl-bis-(heptanoyl)silane, dimethyl-bis-(4-methylpentanoyl)silane, and dimethyl-bis-(2-ethyl,2-methylbutanoyl)silane.

That which is claimed is:

1. A composition of matter consisting essentially of (1) a trimethylsiloxy endblocked polydimethylsiloxane fluid having a viscosity of from 0.65 to 1,000,000 cs. and (2) a silane of the formula (CH$_3$)$_2$Si(OOCR)$_2$ in which R is an alkyl radical of from 5 to 8 carbon atoms, (2) being present in amount sufficient to remove from the mixture up to 1% by weight water based on the weight of (1).

2. A composition in accordance with claim 1 which also contains a catalytic amount of an amine which is soluble in the mixture and which has a boiling point of above 150°C. at 760 mm. of mercury.

3. A composition of matter in accordance with claim 1 in which (1) has a viscosity from 50 to 10,000 cs.

4. A composition in accordance with claim 3 which also contains a catalytic amount of an amine which is soluble in the mixture and which has a boiling point above 150°C. at 760 mm. of mercury.

* * * * *